ns

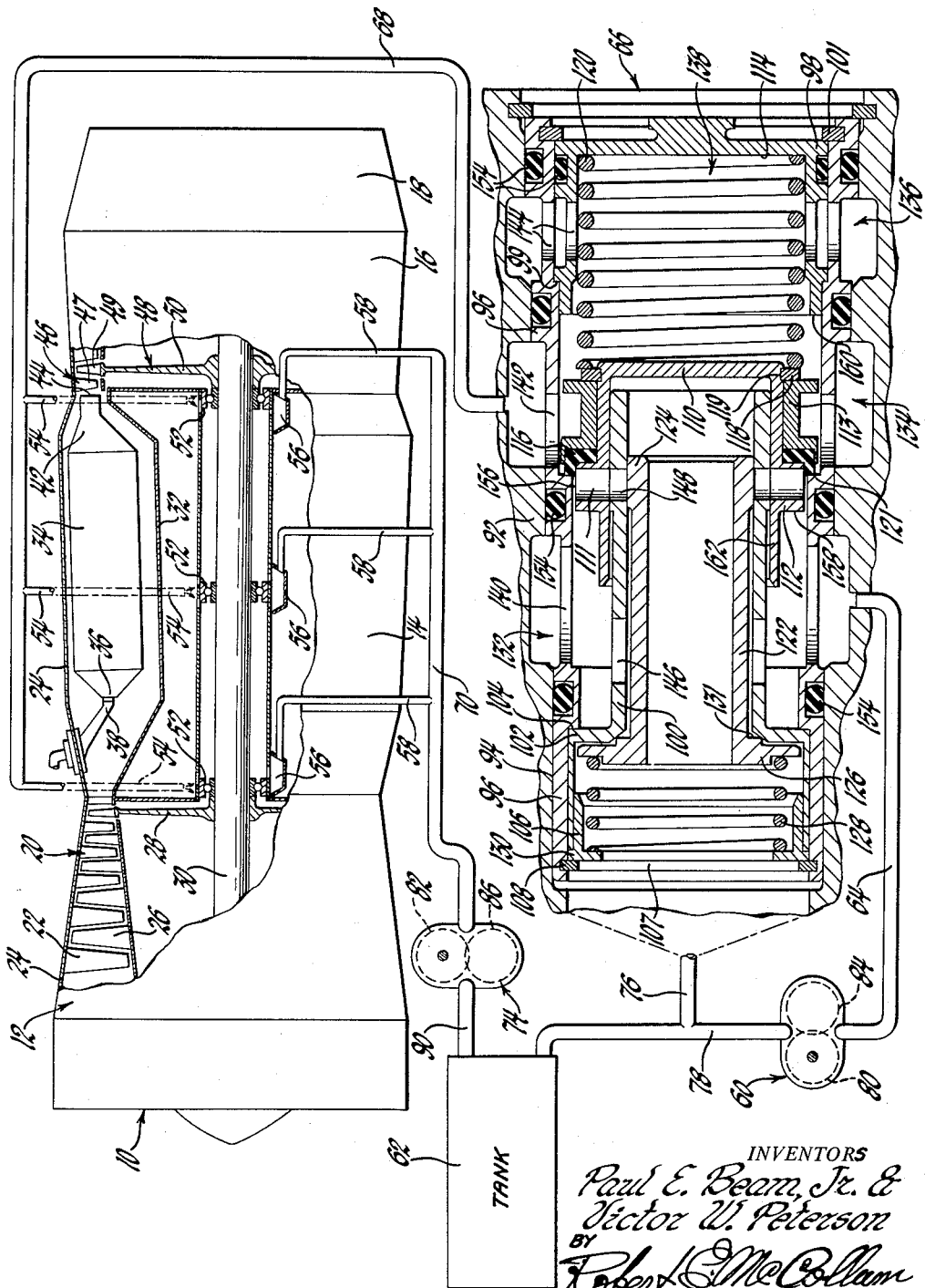

United States Patent Office 2,996,146
Patented Aug. 15, 1961

2,996,146
LUBRICATION SYSTEM
Paul E. Beam, Jr., and Victor W. Peterson, Indianapolis, Ind., assignors to General Motors Corporation, Detroit, Mich., a corporation of Delaware
Filed Oct. 13, 1958, Ser. No. 766,858
10 Claims. (Cl. 184—6)

This invention relates to an oil lubricating system.

More particularly, this invention relates to a lubricating system of the dry sump type wherein a scavenge pump is provided to maintain the oil sumps free of lubricant drained thereto from the bearings. In installations of this type, difficulty has been experienced in the past, at low r.p.m. of the drive shaft, with excess oil in the sumps upon engine shutdown. This is often a result of the scavenge pump being less efficient at low r.p.m. than the main lubricant pump, thereby causing more lubricant to be delivered to the sumps than the scavenge pump is capable of returning to the tank. As a result, on engine shutdown, the sumps may be filled to a point of spilling over into the engine proper with a resultant explosive condition possible upon subsequent engine light-off.

This invention eliminates the above dangerous condition by providing a shutdown by-pass control mechanism in the supply line from the main lubricant pump to the bearings operating in a manner to by-pass all of the oil away from the bearings at low r.p.m. of the drive shaft upon shutdown of the engine. The scavenge pump is thus able to maintain the sumps dry at all times. This invention does not, however, interfere with the proper lubrication of the bearings during normal operation of the engine.

Therefore, it is an object of this invention to provide a lubricant by-pass control mechanism in an engine lubricating system to prevent an excess amount of lubricant in the sumps upon engine shutdown.

It is a further object of this invention to provide a shutdown lubricant by-pass valve mechanism in the lubricating system of a gas turbine engine operable at a predetermined reduced speed of the engine drive shaft upon engine shutdown to by-pass the entire output of the main lubricant pump back to the suction side of the pump, while, however, maintaining full lubrication to the bearings during engine start at low r.p.m.

Other features, advantages and objects will become apparent by reference to the detailed description of the invention and to the drawing wherein the invention is illustrated schematically in its preferred embodiment.

Referring now to the drawing, schematically illustrated herein is a gas turbine engine 10 together with the oil lubrication control system embodying this invention. The engine 10 may be of the conventional type having a compressor section 12, a combustion section 14, a turbine section 16 and an exhaust nozzle 18. The compressor section 12 includes an axial flow compressor 20 having a plurality of stages each including a row of circumferentially spaced stator vanes 22 secured to the engine casing 24 and a plurality of circumferentially spaced rotor blades 26 secured to a rotor wheel or disk 28 in turn suitably secured to the engine drive shaft 30 to be rotated thereby.

The combustion section 14 is defined by the engine casing 24 and an inner annular structure 32 between which are suitably positioned a number of circumferentially spaced combustion cans 34 for the burning of fuel therein. Each of the cans 34 is supported by and joined at one end 36 to a conventional fuel nozzle 38, and at its transition section end 42 is supported by and connected to the inlet 44 of the turbine section 16. While only one can 34 is shown, six to eight cans are preferred, although the exact number may be a matter of choice.

The turbine section 16 includes an axial flow turbine having at least one stage as shown consisting of a stator vane assembly 46 having a plurality of circumferentially spaced stator vanes 47 suitably secured to the casing and cooperating with a rotor blade assembly 48 having a plurality of circumferentially spaced rotor blades 49 secured to a rotor 50 splined to or otherwise suitably connected to the drive shaft 30. As shown, drive shaft 30 is supported for rotation in the engine casing 24 by a number of bearings 52. It is the lubrication of and return of the excess lubricant from these bearings 52 to the oil reservoir with which the present invention is concerned. As shown schematically, each of the bearings is adapted to be sprayed with lubricant supplied thereto through suitable conduits 54. Sumps 56 are provided adjacent the bearings for collecting the excess lubricant delivered thereto and are drained to an oil reservoir 62 through other conduits 58.

Before proceeding further with a detailed description of the control mechanism for this lubricating system, a brief outline of the operation thereof will be given. As seen in the figure, a main lubricant pump 60 draws lubricant, oil in this case, from a supply tank 62 passing the oil through a main supply conduit 64 and a control mechansm 66 to a line 68 connecting with the conduits 54 leading to the several bearings. The excess oil from the bearings is drained into sumps 56 and therefrom through lines 58 and connecting line 70 to the tank 62 by a scavenge pump 74. The control mechansim 66, with which the present invention is concerned primarily, overcomes an inherent deficiency of the scavenge pump 74 caused by the inability of the pump to maintain the sumps 56 dry at low r.p.m. of the engine shaft due to less efficient operation of this pump at this speed as compared to the efficiency of the main pump 60. The control mechanism in general permits unrestricted supply of lube oil to the bearings under normal engine operating conditions, while by-passing the oil back to the intake side of the main lube pump 60 upon engine shutdown.

Proceeding now to a detailed description of the control system of the invention, as will be seen from the drawing, the two pumps 60 and 74 are of the conventional positive displacement type having driving gears 80 and 82 driven by the engine drive shaft 30 through suitable accessory drive mechanisms (not shown), and meshing with driven gears 84 and 86, respectively, so that upon rotation thereof, main lube pump 60 will draw oil from the tank 62 through an intake line 78 discharging the same into the main supply line 64, while at the same time, the scavenge pump 74 drains the excess oil from the sumps 56 through lines 58 and an intake line 70 discharging the same through a feed line 90 to the tank 62.

Referring now more particularly to the shutdown by-pass control mechanism 66, this mechanism comprises a valve body 92 suitably bored at 94 for the insertion therein of a stationary valve support sleeve 96. Support 96 has mounted therein at one end a U-shaped closure sleeve 98 axially positioned between a shoulder 99 on the support 96 and a snap ring 101 positioned in a groove in the end of support 96, this closure sleeve preventing the drain of lubricant through this end of the valve bore. Mounted within the valve support 96 at its other end is an open ended stepped sleeve 100 enlarged at 102 and secured axially within the support 96 by abutting a shoulder 104 on the support 96 at one end, with the opposite end abutting a cup-shaped stop means 106 engaging a snap ring 108 positioned in a groove in the support 96. Stop means 106 is apertured at 107 as shown for a purpose to be described.

Telescopically and slideably mounted on the sleeve 100 internally of the stationary support 96 is a cup-shaped sleeve valve 110 having a number of circumferentially spaced oil carrying passages 111 provided in an annular boss 112 for a purpose to be described later. Surrounding the sleeve valve is a U-shaped seal positioner 113. Between the seal positioner and the boss 112 is fitted an annular lip seal 116 held axially in position by a snap ring 118 engaged in a groove 119 in the end of sleeve valve 110. The snap ring also serves as a seat for one end of a compression spring 120, having its other end seated against the end 114 of closure 98. Spring 120 normally biases sleeve valve 110 to the position shown seating the lip seal against a shoulder 121 on the support 96 to prevent communication of oil between lines 64 and 68 as will be described later.

A further internal sleeve valve 122 is slideably mounted within the support sleeve 100 and includes an enlarged annular port closure member 124 at one end with an annular flange 126 at its other end serving as a seat for one end of a compression spring 128 seated at its other end on the annular end plate 130 of stop means 106. The flange 126 also serves as a valve member by having an annular sharp edge shoulder 131 thereon providing a line contact with the sleeve 100 for a purpose to be described later. As is seen in the figure, the valve body is provided with suitable annular passages 132, 134 and 136 connected respectively with the lubricant supply line 64, bearing oil supply line 68, and to a vent line (not shown) connected to the accessory housing of the engine. Support 96 and closure sleeve 98 are further provided with suitable circumferentially spaced bores 140, 142, 144, 146 and 148 for providing communication of oil from the annular passages 132, 134 and 136 to the several sleeve valves and for venting the chamber 138 defined by the sleeves 98 and 96 and the end of sleeve valve 110. As is seen in the figure, the bores 111 and 148 are radially aligned. The boss portion 112 of the sleeve valve 110 extends outwardly to a point adjacent the support means 96, however providing a clearance therebetween acting as a metering orifice 156 to meter oil therethrough as will be explained. It will also be seen that suitable seal members 154 are provided between the support means 96 and the valve body to prevent the leakage of oil between annular passages.

It is believed that the invention will be understood more clearly by a detailed description of the operation thereof using exemplary pressure levels.

Referring therefore to the operation of the lubrication system, with the engine inoperative, the parts of the control mechanism 66 will be positioned as shown, and no lubricant will be supplied to the bearings. Upon engine fire-up, main oil pump 60 will draw oil from tank 62 for delivery into annular passage 132 bleeding some of the oil through the metering orifice 156 into the hollow space defined by the bores 111 and 148. However, with the sleeve 122 in the position shown due to the force of spring 128, port closure 124 blocks further flow of the oil in this direction. Due to the force of spring 120, sleeve valve 110 is in the position shown with lip seal 116 blocking communication of oil between passages 132 and 134. As a result, increased rotation of pump 60 effects a build-up of pressure against the radial portion 158 of sleeve valve 110 until a pressure of approximately 18 p.s.i., for example, is obtained, at which time sleeve valve 110 is cracked open and moved to the right to admit oil to the annular passage 134, the bearing lubricant supply line 68 and lines 54 to flow to the bearings 52 and lubricate the same. As sleeve valve 110 moves to the right, portion 162 thereof also moves to cover the bore 148 in sleeve 100. Since port closure 124 of sleeve 122 is still in the position shown, the movement of portion 162 has no effect at this time. Oil is also admitted through bore 146 of sleeve 100 to the annular passage defined by the space between sleeve 100 and 122 to attempt to move sleeve 122 relative to sleeve 100. However, because of the small area against which the oil is acting, the oil pressure is unable to overcome the force of spring 128 at this time and sleeve 122 will remain in the position shown.

Further build-up in pressure against the face of the boss 112 will be effected until a pressure level of approximately 22 p.s.i. is reached whereupon the sleeve valve 110 will have moved to the right of that shown until it abuts the end 160 of the sleeve closure means 98. In this position, there will be unrestricted flow of oil between passages 132 and 134, with portion 162 of the sleeve valve 110 at this time being positioned across the bore 148 of sleeve 100 closing the bore. At approximately 50 p.s.i., for example, the pressure of the oil acting on the annular area of shoulder 131 of sleeve valve 122 is sufficient to overcome the force of spring 128 and crack open the valve. Immediately upon opening, a larger area, i.e., the remaining portion of flange 126, is exposed to the oil pressure thereby quickly moving the sleeve valve 122 against the stop 106. Because of the larger effective area, a pressure of only 8 p.s.i. is then required to maintain the sleeve in its leftward position against the stop 106, thereby providing a hysteresis effect. Movement of sleeve valve 122 also causes the port closure 124 to move uncovering bore 148 and conditioning the mechanism to by-pass oil back to the pump intake line 78 through the interior of the sleeve valve 122, aperture 107, the open end of the valve body, and a by-pass conduit 76; however, since portion 162 of sleeve valve 110 now closes bore 148, no oil is by-passed at this time. All the oil therefore continues to be fed from the main pump 60 to the bearings through the conduits 64, 68 and 54, with the scavenge pump 74 returning the excess oil to oil tank 62 through lines 58, 70 and 90. It is to be noted that at this engine r.p.m., the scavenge pump is operating with sufficient efficiency to maintain the sumps 56 dry.

On engine shutdown, a decrease in the drive shaft speed to approximately 1600 r.p.m., for example, decreases the oil pressure to approximately 22 p.s.i. Below this pressure level, the force of spring 120 moves the sleeve valve 110 to its original position shown in the drawing uncovering bore 148 and seating lip seal 116 against the shoulder 121 of support 96 to block the supply of the lube oil to line 68. Since sleeve valve 122 is still positioned such that bore 148 is open, all of the oil from pump 60 then flows through bores 111 and 148 into the interior of sleeve 122 to pass through the by-pass conduit 76 to the intake of the main pump. Upon a further decrease in pump speed, the pressure decreases to or below 8 p.s.i. whereupon the force of spring 128 is sufficient to move sleeve valve 122 and port closure 124 to the right to the position shown closing bore 148. Thereafter, at pump r.p.m. producing less than an 8 p.s.i. pressure level, no lubricant will be fed to the bearing lube supply line 68 or the by-pass conduit 76.

The metering orifice 156 operates as described above and additionally serves as a safety measure to provide lubrication of the system when necessary. For example, if, in operating the engine after fire-up, and after sleeve valves 110 and 122 have both fully opened, there is a momentary drop in the oil pressure to a valve between 8 p.s.i. and 20 p.s.i., without the metering orifice 156, all of the oil from pump 60 would be by-passed to the by-pass conduit 76 through the open bores 111 and 148 without providing lubrication for the engine. However, because of the metering orifice 156, the volume of lubricant passing therethrough is restricted permitting a pressure build-up on the radial face 158 of sleeve valve 110 thereby again moving the sleeve valve 110 to the right to flow oil to the bearing oil supply line 68, the flange 162 of the sleeve valve 110 at this time again sealing off the flow of oil through bore 148 to the by-pass.

Thus, it will be seen that under normal operating conditions above an 18 p.s.i. pressure level, the entire supply of lubricant from the pump 60 is delivered to the bearings 52 through the shutdown by-pass valve mechanism 66, supply line 68 and conduits 54. The excess lubricant drained from the bearings is removed from the sumps 56 to the tank 62 through conduits 58 and 70 by the sump or scavenge pump 74, thereby maintaining the sumps dry. On shutdown of the engine, reduction in the engine shaft speed to an r.p.m. at which the main pump 60 is operating more efficiently than the scavenge pump 74 effects operation of the shutdown by-pass control mechanism to by-pass all of the flow from the main pump 60 to its intake line. Under these conditions, the scavenge pump 74 is capable of maintaining the sump 56 dry of lubricant and a dangerous engine condition is eliminated.

From the foregoing it will be seen that this invention provides an engine lubricating system that provides adequate lubrication of the engine during all phases of operation, and prevents excessive amounts of lubricant being present in the sumps during engine shutdown. While the drawings illustrate the preferred embodiment of the invention, it will be clear that many modifications can be made therein by those skilled in the art without departing from the scope of the invention.

We claim:

1. A fluid lubricating system including means adapted to be lubricated with fluid, a rotatable fluid pressure pump providing a source of fluid under pressure, conduit means connecting said source and said means to be lubricated, means for rotating said pump, and means in said conduit means by-passing the fluid being delivered from said pump away from said means to be lubricated at a predetermined reduction in speed of rotation of said pump.

2. A fluid lubricating system for a turbomachine comprising a drive shaft, a stationary casing for said turbomachine, bearings rotatably supporting said shaft upon said casing, and means for supplying lubricant to said bearings, said means including a lubricant pump driven by said shaft providing a source of lubricant under pressure, conduit means connecting said source and said bearings for lubricating the same, and control means within said conduit means for controlling the distribution of said lubricant from said pump upon a reduction in the drive of said pump by said shaft, other conduit means connecting a portion of said control means and the inlet of said pump, said control means by-passing said lubricant delivered thereto to the inlet of said pump in response to a predetermined reduction in the speed of said drive shaft.

3. In a turbomachine having a rotatable drive shaft, a stationary casing and bearings rotatably supporting said drive shaft for rotation with respect to said casing, a lubricating system for lubricating said bearings comprising a rotatable lubricant pump driven by said shaft having a lubricant inlet and outlet, conduit means connecting said pump outlet and said bearings for lubricating the same, and control means within said conduit means for controlling the delivery of lubricant from said pump to said bearings, said control means at times by-ypassing the lubricant in said conduit means to the inlet of said pump in response to a predetermined decrease in the speed of rotation of said pump.

4. A lubrication system comprising means to be lubricated, a rotatable lubricant pump providing a source of lubricant under pressure, said pump having a lubricant inlet and outlet, conduit means connecting said outlet to said means to be lubricated, means for rotating said pump, and control means within said conduit means for controlling the distribution of the lubricant from said pump, other conduit means connecting a portion of said control means to the inlet of said pump, said control means comprising valve means movable to a plurality of positions for selectively controlling the distribution of lubricant to said means to be lubricated or to the said inlet of said pump, said valve means comprising a first valve movable in response to a predetermined pressure of said lubricant to one position for communicating the lubricant from said pump to said means to be lubricated, said valve means including a second valve movable in response to a higher predetermined pressure of said lubricant for conditioning said control means to by-pass the lubricant to the said inlet of said pump, said lubricant being by-passed through said second valve to the inlet of said pump in response to a predetermined reduction in the speed of rotation of said pump.

5. A lubrication system as in claim 4 wherein the by-passing of lubricant to the inlet of said pump is effected at a lower pressure than the higher predetermined pressure effecting the movement of said second valve to its lubricant by-passing condition position.

6. An engine shutdown lubrication by-pass valve mechanism for a gas turbine engine comprising a stationary engine casing, an engine drive shaft, bearings supported by said casing rotatably supporting said shaft for rotation with respect to said casing, a source of lubricant, a lubricating pump driven by said drive shaft and having a lubricant inlet connected to said source and an outlet, first conduit means connecting said outlet and said bearings for lubricating the same, a lubricant sump for collecting excess lubricant delivered to said bearings, a sump pump driven by said shaft and having an inlet and an outlet, means connecting said sump pump inlet to said sump and said outlet to said source, and control means in said first conduit means for controlling the delivery of lubricant to said bearings, said lubricating pump delivering a quantity of lubricant to said bearings in excess of that needed to lubricate said bearings, said excess lubricant at low speeds of said shaft being greater than the capacity of said sump pump, said control means by-passing the lubricant delivered from the outlet of said lubricating pump to the inlet of said pump at a predetermined reduction in speed of said drive shaft, the by-passing of said lubricant preventing the delivery of a quantity of lubricant in the sump upon engine shutdown in excess of the capacity of said sump pump.

7. An engine shutdown by-pass valve mechanism as in claim 6 wherein said control means comprises a plurality of valves movable between alternate positions to control the flow of lubricant to the bearings, one of said valves being movable in repsonse to a predetermined pressure of said lubricant to communicate said lubricant from said lubricant pump to said bearings, means biasing said first valve to a position preventing communication of lubricant to said bearings, a second valve movable to one position in response to a different predetermined pressure of the lubricant for conditioning said control means to by-pass said lubricant to the inlet of said lubricant pump, means biasing said second valve to a position preventing the by-passing of lubricant to said first pump, the attainment of different predetermined pressures of said lubricant effecting movement of said first and second valves to their first mentioned positions to provide unrestricted flow of lubricant to said bearings, a reduction in speed of said drive shaft to a predetermined level reducing the pressure of said lubricant effecting movement of said first valve to its second position by said biasing means with said second valve remaining in its first position to by-pass all of the lubricant delivered from the outlet of said lubricant pump to the inlet of said pump.

8. A lubrication system including means to be lubricated, a source of lubricant, a rotatable lubricant pump having an inlet connected to said source and an outlet, first conduit means connecting said outlet to said means to be lubricated, a rotatable sump pump having an outlet connected to said source and an inlet, a sump having an inlet connected to said means to be lubricated and an outlet connected to said sump pump inlet, said lubricant pump having a greater pumping capacity than the need for lubricant of said means to be lubricated providing the delivery of excess lubricant to said means to be lubricated and therefrom into said sump, the quantity of said excess lubricant being at times greater than that which the sump pump is capable of returning to the source, and control means in said conduit means moveable to a plurality of positions controlling the distribution of lubricant to said means to be lubricated, other conduit means connecting said control means to the inlet of said lubricant pump, said control means in one of said positions by-passing the lubricant from said lubricant pump outlet to said lubricant pump inlet preventing the presence in said sump of a quantity of lubricant in excess of that which the said sump pump is capable of returning to the source.

9. A lubrication system including means to be lubricated, a source of lubricant, a rotatable lubricant pump having an inlet connected to said source and an outlet, first conduit means connecting said outlet to said means to be lubricated, a rotatable sump pump having an outlet connected to said source and an inlet, a sump having an inlet connected to said means to be lubricated and an outlet connected to said sump pump inlet, said lubricant pump having a greater pumping capacity than the need for lubricant of said means to be lubricated providing the delivery of excess lubricant to said means and therefrom into said sump, the quantity of said excess lubricant being at times greater than that which the said sump pump is capable of returning to the source, and control means in said first conduit means controlling the distribution of lubricant to said means to be lubricated, other conduit means connecting said control means to the inlet of said lubricant pump, said control means comprising valve means moveable to a plurality of positions, said valve means in one of said positions by-passing the lubricant from said lubricant pump outlet to said lubricant pump inlet preventing the presence in said sump of a quantity of lubricant in excess of that which the said sump pump is capable of returning to the source.

10. A lubrication system including means to be lubricated, a source of lubricant, a rotatable lubricant pump having an inlet connected to said source and an outlet, pump rotating means to rotate said pump, first conduit means connecting said outlet to said means to be lubricated, a rotatable sump pump having an outlet connected to said source and an inlet, a sump having an inlet connected to said means to be lubricated and an outlet connected to said sump pump inlet, said lubricant pump having a greater pumping capacity than the need for lubricant of said means to be lubricated providing the supply of excess lubricant to said means and therefrom into said sump, the quantity of said excess lubricant being at times greater than that which said sump pump is capable of returning to the source, and control means in said conduit means controlling the delivery of lubricant to said means to be lubricated, other conduit means connecting said control means to the inlet of said lubricant pump, said control means comprising valve means movable to a plurality of positions in response to a predetermined rotation of said pump rotating means, said valve means in one of said positions by-passing the lubricant from said lubricant pump outlet to said lubricant pump inlet preventing the presence in said sump of a quantity of lubricant in excess of that which the said sump pump is capable of returning to the source.

References Cited in the file of this patent

UNITED STATES PATENTS

| | | |
|---|---|---|
| 974,249 | Eckhard | Nov. 1, 1910 |
| 1,799,271 | Woolson | Apr. 7, 1931 |
| 1,824,465 | Carter | Sept. 22, 1931 |
| 2,550,967 | Burke et al. | May 1, 1951 |
| 2,642,155 | Wilhelm et al. | June 16, 1953 |
| 2,676,458 | Hill | Apr. 27, 1954 |

UNITED STATES PATENT OFFICE
CERTIFICATE OF CORRECTION

Patent No. 2,996,146            August 15, 1961

Paul E. Beam, Jr., et al.

It is hereby certified that error appears in the above numbered patent requiring correction and that the said Letters Patent should read as corrected below.

Column 5, line 58, for "by-ypassing" read -- by-passing --; column 7, line 25, after "means" insert -- to be lubricated --.

Signed and sealed this 2nd day of January 1962.

(SEAL)
Attest:

ERNEST W. SWIDER
Attesting Officer

DAVID L. LADD
Commissioner of Patents